United States Patent
Knoppert et al.

(10) Patent No.: US 8,244,317 B2
(45) Date of Patent: Aug. 14, 2012

(54) INDICATOR SHELF FOR PORTABLE ELECTRONIC DEVICE

(75) Inventors: Michiel S Knoppert, Chicago, IL (US); Renee M Garnham, Chicago, IL (US)

(73) Assignee: Motorola Mobility LLC, Libertyville, IL (US)

( * ) Notice: Subject to any disclaimer, the term of this patent is extended or adjusted under 35 U.S.C. 154(b) by 280 days.

(21) Appl. No.: 12/480,289

(22) Filed: Jun. 8, 2009

(65) Prior Publication Data

US 2010/0311478 A1  Dec. 9, 2010

(51) Int. Cl.
*H04M 1/00* (2006.01)
(52) U.S. Cl. ............... 455/575.1; 455/550.1; 455/556.2; 455/575.4
(58) Field of Classification Search .................. None
See application file for complete search history.

(56) References Cited

U.S. PATENT DOCUMENTS

| 7,649,831 | B2 | 1/2010 | Van Rensburg et al. | |
|---|---|---|---|---|
| 2003/0143961 | A1 | 7/2003 | Humphreys et al. | |
| 2004/0192398 | A1* | 9/2004 | Zhu | 455/566 |
| 2005/0124393 | A1 | 6/2005 | Nuovo et al. | |
| 2005/0250532 | A1 | 11/2005 | Hwang et al. | |
| 2007/0093281 | A1* | 4/2007 | Park et al. | 455/575.4 |
| 2007/0232370 | A1* | 10/2007 | Kim | 455/575.4 |
| 2008/0001915 | A1* | 1/2008 | Pihlaja et al. | 345/156 |
| 2008/0274753 | A1 | 11/2008 | Attar et al. | |
| 2009/0122884 | A1 | 5/2009 | Vook et al. | |
| 2010/0023898 | A1 | 1/2010 | Nomura et al. | |
| 2010/0034312 | A1 | 2/2010 | Muharemovic et al. | |

FOREIGN PATENT DOCUMENTS

| EP | 1753152 A1 | 2/2007 |
|---|---|---|
| WO | 2008113210 A1 | 9/2008 |
| WO | 2008137607 A2 | 11/2008 |

OTHER PUBLICATIONS

U.S. Appl. No. 29/329,026, filed Dec. 8, 2008, in the name of Michiel S. Knoppert, et al, entitled "Communication Device".
U.S. Appl. No. 29/329,028, filed Dec. 8, 2008, in the name of Michiel S. Knoppert, et al, entitled "Communication Device".
Patent Cooperation Treaty, "PCT Search Report and Written Opinion of the International Searching Authority" for International Application No. PCT/US2010/034023 Dec. 1, 2010; 9 pages.

(Continued)

*Primary Examiner* — Rafael Pérez-Gutiérrez
*Assistant Examiner* — Suhail Khan

(57) ABSTRACT

There is disclosed a portable electronic device comprising a front surface, a side surface, and an indicator. The front surface is substantially parallel to a horizontal axis, and the side surface is connected to the front surface. The side surface includes an angled surface and forward side portion between the angled surface and the front surface, in which the angled surface is angled relative to the horizontal axis. The indicator is located at the angled surface of the side surface. For one embodiment, the side surface includes a groove having two angled surfaces and a meeting point where the surfaces meet. The one angled surface angles downward from the meeting point relative to the horizontal axis, and the other angled surface angles upward from the meeting point relative to the horizontal axis. For another embodiment, the device may have a slider form factor.

12 Claims, 4 Drawing Sheets

OTHER PUBLICATIONS

Patent Cooperation Treaty, "PCT Search Report and Written Opinion of the International Searching Authority" for International Application No. PCT/US2010/026579 Feb. 4, 2011, 13 pages.

3GPP TS 36.211 V8.6.0 (Mar. 2009) 3rd Generation Partnership Project; Technical Specification Group Radio Access Network; Evolved Universal Terrestrial Radio Access (E-UTRA); Physical Channels and Modulation (Release 8), 82 pages.

USPTO Patent Application Titled "Method for Precoding Based on Antenna Grouping" U.S. Appl. No. 12/899,211, filed Oct. 6, 2010.

3GPP TR 36.814 V9.0.0 (Mar. 2010) 3rd Generation Partnership Project; Technical Specification Group Radio Access Network; Further Advancements for E-UTRA Physical Layer Aspects (Release 9), 103 pages.

USPTO Patent Application Titled "Method of Precoder Information Feedback in Multi-Antenna Wireless Communication Systems" U.S. Appl. No. 61/331,818, filed May 5, 2010.

3GPP TSG RAN WG1 #61bis; Beijing, China; Apr. 12-16, 2010; Erisson, ST-Ericsson, "Further Refinements of Feedback Framework" R1-101742, 8 pages.

USPTO Patent Application Titled "Method for Channel Quality Feedback in Wireless Communication Systems" U.S. Appl. No. 12/823,178, filed Jun. 25, 2010.

3GPP TSG RAN1 #58; Shenzhen, China; Aug. 24-28, 2009, Motorola, "Comparison of PMI-based and SCF-based MU-MIMO" R1-093421, 5 pages.

3GPP TSG RAN WG1 #58; Shenzhen, China Aug. 24-28, 2009, "Implicit feedback in support of downlink MU-MIMO" Texas Instruments; R1-093176, 4 pages.

3GPP TSG RAN WG1 #57bis; Los Angeles, USA; Jun. 29-Jul. 3, 2009, "Feedback considerations for DL MIMO and CoMP" Qualcomm Europe; R1-092695, 6 pages.

3GPP TSG RAN WG1 #60; San Francisco, USA Feb. 22-26, 2010, "Companion Subset Based PMI/CQI Feedback for LTE-A MU-MIMO" RIM; R1-101104; 8 pages.

3GPP TSG RAN WG1 #56; Athens, Greece; Feb. 9-13, 2009, "'Best Companion' reporting for improved single-cell MU-MIMO pairing" Alcatel-Lucent, R1-090926, 28 pages.

IEEE 802.16 Broadband Wireless Access Working Group "IEEE 802.16m System Description Document [Draft]" Nokia, Submitted Feb. 7, 2009, 171 pages.

Syed Ali Jafar, Andrea Goldsmith; "On Optimality of Beamforming for Multiple Antenna Systems with Imperfect Feedback" Department of Electrical Engineering, Stanford University, CA, USA; 7 pages.

Eugene Visotsky and Upamanyu Madhow; "Space-Time Transmit Precoding With Imperfect Feedback" IEEE Transactions on Inforamtion Theory, vol. 47, No. 6; Sep. 2001, pp. 2632-2639.

USPTO Patent Application Titled "Interference Control SINR Optimization and Signaling Enhancements to Improve the Performance of OTDOA Measurements" U.S. Appl. No. 12/813,221, filed Jun. 10, 2010.

3GPP TSG RAN WG1 #55bis, Ljubljana, Slovenia; Jan. 12-19, 2009, "On OTDOA in LTE" QUALCOMM, R1-090353, 8 pages.

3GPP TSG RAN WG1 #55bis; Ljubljana, Slovenia; Jan. 12-16, 2009, "Improving the hearability of LTE Positioning Service" Alcatel-Lucent, R1-090053, 5 pages.

3GPP TSG Ran #42, Athens, Greece, Dec. 2-5, 2008, "Positioning Support for LTE" Article 39, 3GPP TR 21.900; RP-080995, 6 pages.

Patent Cooperation Treaty, "PCT Invitation to Pay Additional Fees and, where Applicable, Protest Fee" for International Application No. PCT/US2010/038257 Oct. 1, 2010, 9 pages.

3GPP TSG RAN WG4 (Radio) #20, New Jersey, USA; Nov. 12-16, 2001, UTRAN SFN-SFN observed time difference measurement & 3GPP TS 25.311 IE 10.3.7.106 "UE positioning OTDOA neighbour cell info' assistance data fields", Tdoc R4-011408, 4 pages.

\* cited by examiner

INDICATOR SHELF FOR PORTABLE ELECTRONIC DEVICE

FIELD OF THE INVENTION

The present invention relates generally to the field of portable electronic devices and, more particularly, to the field of a portable electronic device having visual indicators that are visible from some, but not all, external views.

BACKGROUND OF THE INVENTION

A portable electronic device is capable of interacting with a user and transportable due to its diminutive size and portable power supply. An example of a portable electronic device is a wireless communication device, which provides long-range communication of voice or data over a communication network of specialized base stations to other communication devices remote from the wireless communication device. Portable electronic devices come in a variety of form factors, such as brick, bar, flip/clamshell, slider or rotator/swivel form factors, and each form factor can have a touchscreen or QWERTY keypad. Regardless of the form factor, the device generally includes some type of indicator to convey information to a user or otherwise facilitate the user's use and enjoyment of the device.

Indicators are often used by portable electronic devices as labels to let a user know about certain features or functions the device. For example, one type of indicator is a letter or number label that is provided on a keypad or keyboard. By viewing the indicator, the user may know which number or letter of the alphabet corresponds to the key labeled by the indicator.

Indicators are commonly placed at an outer surface of a portable electronic device so that is in clear view and highly visible. As such, the indicators are always visible and available to the user. On the other hand, many users are capable of remembering the feature or function labeled by an indicator after operating its associated device for an initial time period. Thus, the indicators are primarily useful when a user first learns to use the device and secondarily useful when the user desires a refresher of the labeled feature or function.

Some portable electronic devices attempt to maintain a desirable aesthetic appearance that may otherwise be diminished due to the highly visible indicator. The appearance may be maintained by limiting the times when the indicator is visible. Such devices, however, require active components that have a cost associated with them and the indicator is still highly visible at certain times. Other devices may maintain their desired appearance by creating a removable indicator, but such devices do not provide any type of refresher of the labeled feature or function to the user after the indictor is removed.

DETAILED DESCRIPTION OF THE EMBODIMENTS

There is described an indicator shelf for a portable electronic device that makes effective use of one or more indicators for facilitated usage of the device while minimizing any negative impact on the aesthetic appearance of the device. The indicator or indicators are tucked away with the shelf while remaining visible so that the indicator(s) may be viewed when desired. For some embodiment, the indicators may communicate functions associated with side button behavior to a user. For other embodiments, the indicators may dynamically provide status or other information to the user.

One aspect of the present invention is a portable electronic device comprising a front surface, a side surface and an indicator. The front surface is substantially parallel to a horizontal axis. The side surface is connected to the front surface. The side surface includes an angled surface and forward side portion between the angled surface and the front surface, and the angled surface is angled relative to the horizontal axis. The indicator is located at the angled surface of the side surface.

Another aspect of the present invention is that the side surface includes a groove having a first angled surface, a second angled surface and a meeting point where the first and second angled surfaces meet. The first angled surface angles downward from the meeting point relative to the horizontal axis, and the second angled surface angles upward from the meeting point relative to the horizontal axis. The indicator is located at the first angled surface of the groove.

Still another aspect of the present invention is a portable electronic device having a slider form factor. The device comprises a first housing having an upper surface, and a second housing having a lower surface slidably coupled to the upper surface of the first housing. The second housing is capable of sliding to a closed position relative to the first housing in which upper and lower surfaces are substantially adjacent and concealed. The second housing is also capable of sliding to an open position relative to the first housing in which only a portion of the upper and lower surfaces are adjacent and concealed and the remainders of the upper and lower surfaces are offset and exposed. The upper surface of the first housing includes a first angled surface that is angled relative to the upper surface, the lower surface of the second housing includes a second angled surface that is angled relative to the lower surface, and the first and second angles are angled away from each other. The indicator is located at the first angled surface of the upper surface of the first housing.

Figure 1:
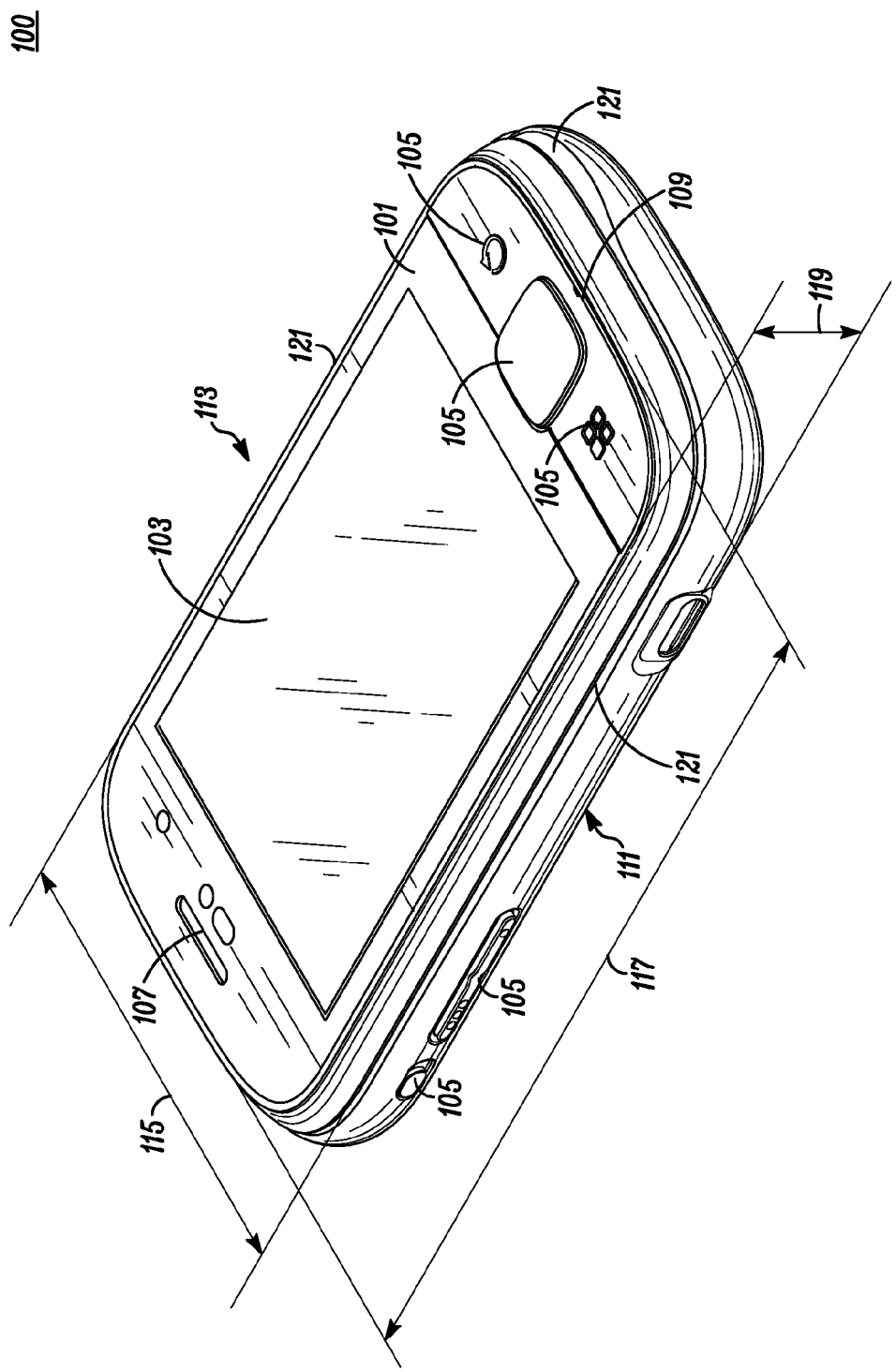
FIG. 1 is a perspective view of an embodiment in accordance with the present invention in which the front, left and bottom surfaces of the embodiment are shown.

Referring to FIG. 1, there is illustrated a perspective view of an example portable electronic device 100 in accordance with the present invention. The device 100 may be any type of device capable of utilizing one or more indicators to communicate functions associated with side button behavior or dynamically provide status or other information to the user. Examples of the portable electronic device 100 include, but are not limited to, cellular-based mobile phones, WLAN-based mobile phones, personal digital assistants, personal navigation device, touch screen input device, pen-based input devices, portable video and/or audio players, and the like.

For one embodiment, the portable electronic device 100 has a housing comprising a front surface 101 which includes a visible display 103 and a user interface. For example, the user interface may be the touch-sensitive surface that overlays the display 103. For another embodiment, the user interface of the portable electronic device 100 may include a touch-sensitive surface supported by the housing and does not overlay any type of display. For yet another embodiment, the user interface of the portable electronic device 100 may include one or more input keys 105 used in conjunction with the touch-sensitive surface. Examples of the input key or keys 105 include, but are not limited to, keys of an alpha or numeric keypad, a physical keys, touch-sensitive surfaces, mechanical surfaces, multipoint directional keys and side buttons 105111. The portable electronic device 100 may also comprise apertures 107, 109 for audio output and input at the surface. It is to be understood that the portable electronic device 100 may include a variety of different combination of displays and interfaces.

It is to be understood that the portable electronic device 100 make take the form of a variety of form factors, such as bar, flip/clam, slider and rotator form factors. For example, for the embodiment shown in FIG. 1, the portable electronic device 100 may include a first housing 111 having an upper surface, a second housing 113 having a lower surface slidably coupled to the upper surface of the first housing. As represented in FIG. 1, the device 100 is shown in a closed position. The second housing 113 is capable of sliding to a closed position relative to the first housing in which upper and lower surfaces are substantially adjacent and concealed. The device 100 may also open to an open position. The second housing 113 is capable of sliding to an open position relative to the first housing 111 in which only a portion of the upper and lower surfaces are adjacent and concealed and the remainders of the upper and lower surfaces are offset and exposed. For another embodiment, the second housing may support a display, a first user interface, an audio input, and an audio output, and the first housing may support a second user interface and a wireless transceiver.

It should also be understood that the dimensions of the portable electronic device 100 may vary as well. For many embodiments, the width 115 and length 117 are the longer dimension, whereas the depth 119 is the shorted dimension. These types of embodiments are well suited for portable electronic devices having a larger display that can make use of the longer width 115 and length 117 and, thus, grooves, cutaways and their associated surfaces 121 may be restricted to the housing surfaces associated with the depth 119 of the device 100.

Figure 2:
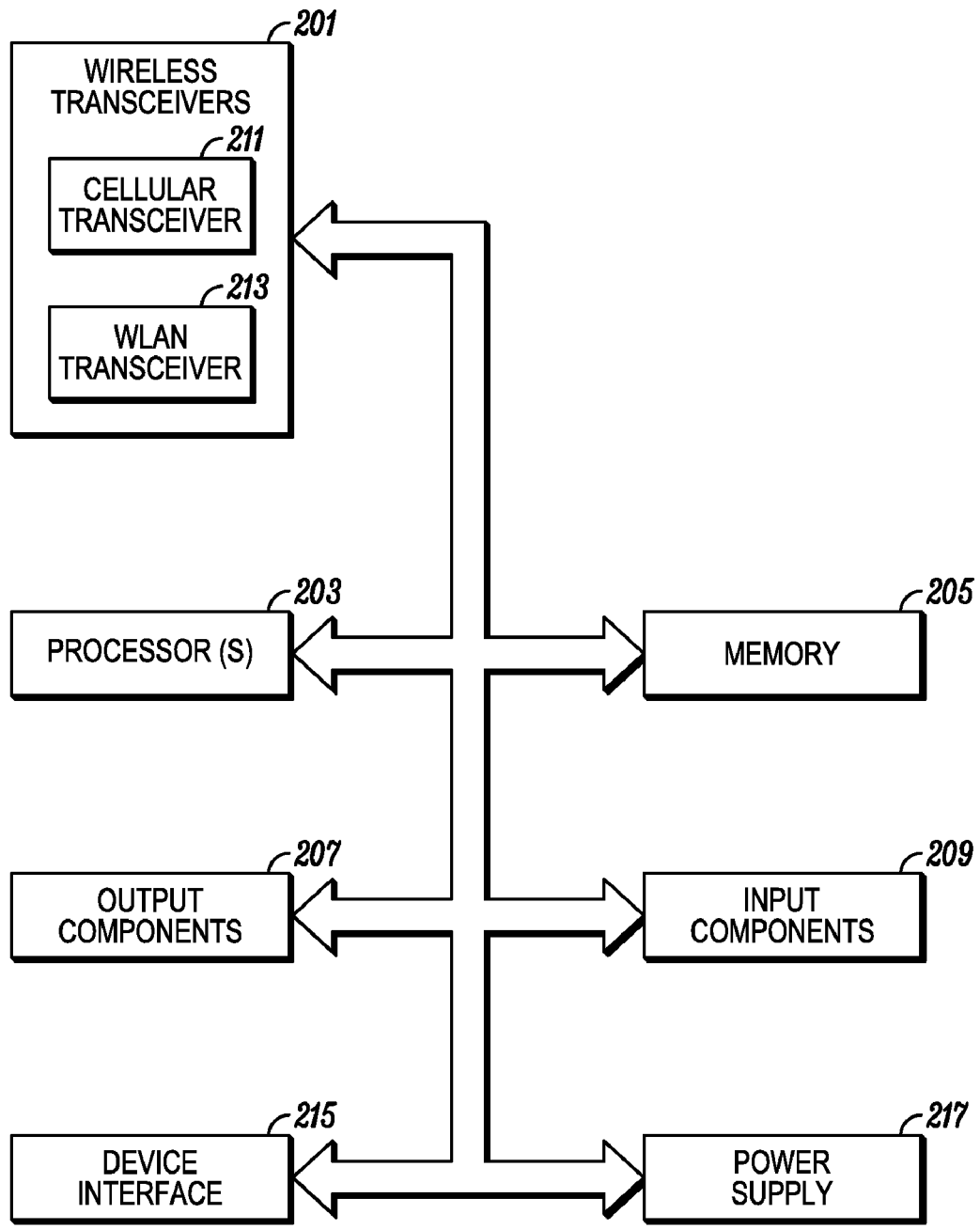
FIG. 2 is a block diagram of example components of the embodiment of FIG. 1.

Referring to FIG. 2, there is shown a block diagram representing example components that may be used for an embodiment in accordance with the present invention. The example embodiment may includes one or more wireless transceivers 201, one or more processors 203, one or more memories 205, one or more output components 207, and one or more input components 209. Each embodiment may include a user interface that comprises one or more output components 207 and one or more input components 209. Each wireless transceiver 201 may utilize wireless technology for communication, such as, but are not limited to, cellular-based communications such as analog communications (using AMPS), digital communications (using CDMA, TDMA, GSM, iDEN, GPRS, or EDGE), and next generation communications (using UMTS, WCDMA, LTE, LTE-A or IEEE 802.16) and their variants, as represented by cellular transceiver 311. Each wireless transceiver 201 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology, as represented by WLAN transceiver 213. Also, each transceiver 201 may be a receiver, a transmitter or both.

The processor 203 may generate commands based on information received from one or more input components 209. The processor 203 may process the received information alone or in combination with other data, such as the information stored in the memory 205. Thus, the memory 205 of the internal components 200 may be used by the processor 203 to store and retrieve data. The data that may be stored by the memory 205 include, but is not limited to, operating systems, applications, and data. Each operating system includes executable code that controls basic functions of the portable electronic device, such as interaction among the components of the internal components 200, communication with external devices via each transceiver 201 and/or the device interface (see below), and storage and retrieval of applications and data to and from the memory 205. Each application includes executable code utilizes an operating system to provide more specific functionality for the portable electronic device. Data is non-executable code or information that may be referenced and/or manipulated by an operating system or application for performing functions of the portable electronic device.

The input components 209, such as a user interface, may produce an input signal in response to detecting a predetermined gesture at the touch-sensitive surface. As a result, a transceiver 201 may terminate communication with the remote device in response to the input signal from the user interface. In addition, the input components 209 may include one or more additional components, such as a video input component such as an optical sensor (for example, a camera), an audio input component such as a microphone, and a mechanical input component or activator such as button or key selection sensors, touch pad sensor, another touch-sensitive sensor, capacitive sensor, motion sensor, and switch. Likewise, the output components 207 of the internal components 200 may include one or more video, audio and/or mechanical outputs. For example, the output components 207 may include a video output component such as a cathode ray tube, liquid crystal display, plasma display, incandescent light, fluorescent light, front or rear projection display, and light emitting diode indicator. Other examples of output components 207 include an audio output component such as a speaker, alarm and/or buzzer, and/or a mechanical output component such as vibrating or motion-based mechanisms.

The internal components 200 may further include a device interface 215 to provide a direct connection to auxiliary components or accessories for additional or enhanced functionality. In addition, the internal components 200 preferably include a power source 217, such as a portable battery, for providing power to the other internal components and allow portability of the portable electronic device 100.

It is to be understood that FIG. 2 is provided for illustrative purposes only and for illustrating components of a portable electronic device in accordance with the present invention, and is not intended to be a complete schematic diagram of the various components required for a portable electronic device. Therefore, a portable electronic device may include various other components not shown in FIG. 2, or may include a combination of two or more components or a division of a particular component into two or more separate components, and still be within the scope of the present invention.

Figure 3:
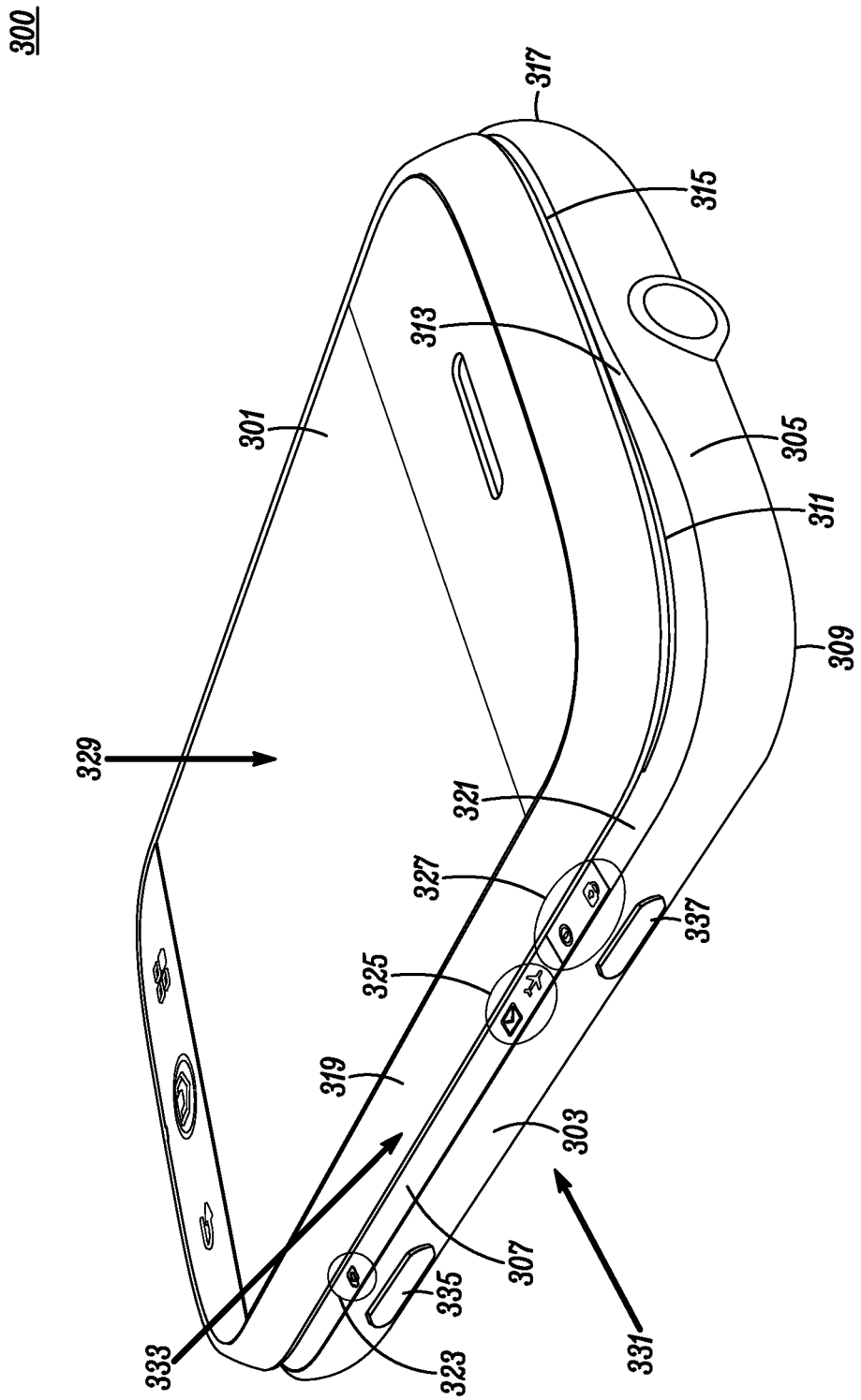
FIG. 3 is another perspective view of the embodiment of FIG. 1 in which the front, right and top surfaces are shown.

Referring to FIG. 3, an embodiment in accordance with the present invention, which is similar to the embodiment illustrated by FIG. 1. In addition to the differing embodiments, the views of the embodiments are also different. FIG. 1 shows an embodiment from a perspective view that shows the front, left and bottom surfaces of the embodiment, whereas FIG. 3 shows a different embodiment (more particularly, a housing 300 of the embodiment) from a different perspective view that shows a front surface 301, a right side surface 303 and a top surface 305 of the embodiment.

As illustrated in FIG. 3, the housing 300 of the portable electronic device includes a groove 307 along the right side surface 303 which is substantially parallel to the top and bottom surfaces 301, 309 and extends the entire length of the right side surface. The groove 301 continues around a top right edge of the housing 300 to the top surface 305 of the housing 300, thus creating a cutout 311. The cutout 311 is actually the portion of the groove 301 that is provided at the top surface 305, including the tapered portion 313 located just before the remaining seam 315 between the upper and lower parts of the device 300. Although the embodiment shown in FIG. 3 illustrates the groove along one side, i.e., the right side surface 303, of the housing 300, it is to be understood that the groove may be provided on the other side, i.e., the left side surface 317, of the device instead, or in addition to, the right side surface.

The groove 307 of the side surface 303 includes a shelf or angled surface 321 that is angled relative to the remainder of the side surface. Also, one or more indicators 323, 325, 327 are located at the angled surface 321 of the side surface 303. The indicators 323, 325, 327 convey information to a user or otherwise facilitate the user's use and enjoyment of the device 100. In addition, the indicators 323, 325, 327 are positioned on the angled surface 321 of the groove 307 to minimize any negative impact on the aesthetic appearance of the device 100. The indicators 323, 325, 327 are tucked away with the angled surface while remaining visible so that they may be viewed when desired. For example, as illustrated in FIG. 3, the indicators 323, 325, 327 and their associated side surface 303 of this embodiment are angled so that they are not directed directly forward toward the front of the device nor directly sideways toward a lateral side of the device. Instead, the indicators 323, 325, 327 and their associated side surface 303 of this embodiment are angled somewhere therebetween. From a front view 329 directly in front of the front surface 301 by a user, the user's view of the indicators 323, 325, 327 is obscured in whole, or in part, by the structure above the indicators. From a side view 331 directly toward the side of the side surface 303 by the user, the user's view of the indicator 323, 325, 327 is askew or distorted due to the angle of the side surface relative to that side view. On the other hand, from a front angled view 333 directly perpendicular to the angled surface 321 or range of angular deviation about the front angled view, the user's view is clear and unobstructed.

For some embodiment, the indicators 323, 325, 327 may communicate functions associated with one or more side buttons or actuators 335, 337 to a user. For example, as illustrated in FIG. 3, an actuator 335 of the first housing may be located in proximity to an associated indicator 323, in which the indicator indicates a function associated with the actuator. The device 100 may include more than one actuator/indicator pair, such as actuator 337 of the first housing which is located in proximity to indicator 327.

For other embodiments, the indicators 323, 325, 327 may dynamically provide status or other information to the user regardless of whether they are within proximity to an actuator 335, 337. For further embodiments, the device 100 may includes a circuit, such as processor 203, and a light source, such as output component 207, coupled to the circuit, in which the light source is capable of illuminating an associated indicator. The circuit may be capable of controlling whether the indicator may be illuminated by the light source. Examples of indicators 323, 325, 327 include, but are not limited to messaging indicators, voicemail indicators, and peripheral indicators.

Figure 4:
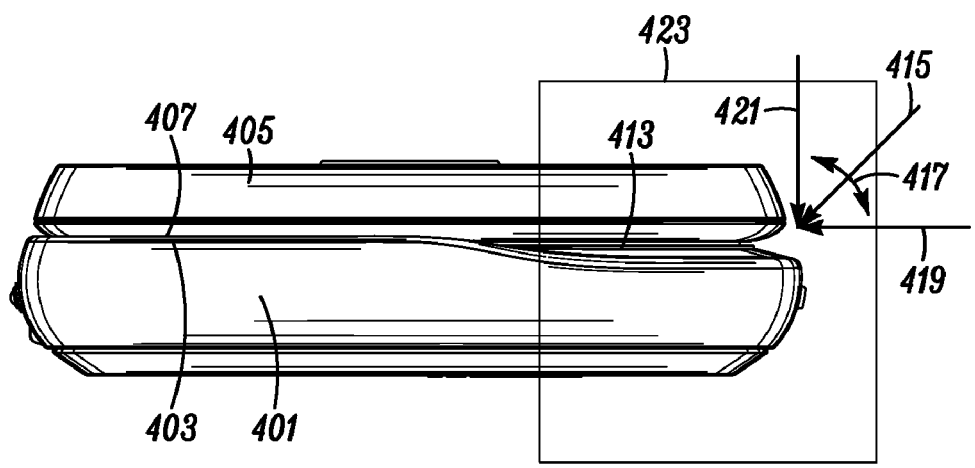
FIG. 4 is a bottom, planar view of the embodiment of FIG. 1.

FIG. 4 is a bottom, planar view of an embodiment in accordance with the present invention. As shown in FIG. 4, the device 100 includes a first housing 401 having an upper surface 403, and a second housing 405 having a lower surface 407 slidably coupled to the upper surface of the first housing. The second housing 405 is capable of sliding to a closed position relative to the first housing 401, as shown in FIG. 4, in which upper and lower surfaces 403, 407 are substantially adjacent and concealed. The second housing 405 is also capable of sliding to an open position relative to the first housing 401 in which only a portion of the upper and lower surfaces 403, 407 are adjacent and concealed and the remainders of the upper and lower surfaces are offset and exposed.

The embodiment includes a groove 413 having one or more indicators located at an angled surface of the groove. The user may have a front angled view 415 directly perpendicular to the angled surface or range of angular deviation 417 about the front angled view. The angle of view would be greater than a direct side view horizontal to the front surface of the device and less than a direct front view perpendicular to the front surface.

Figure 5:
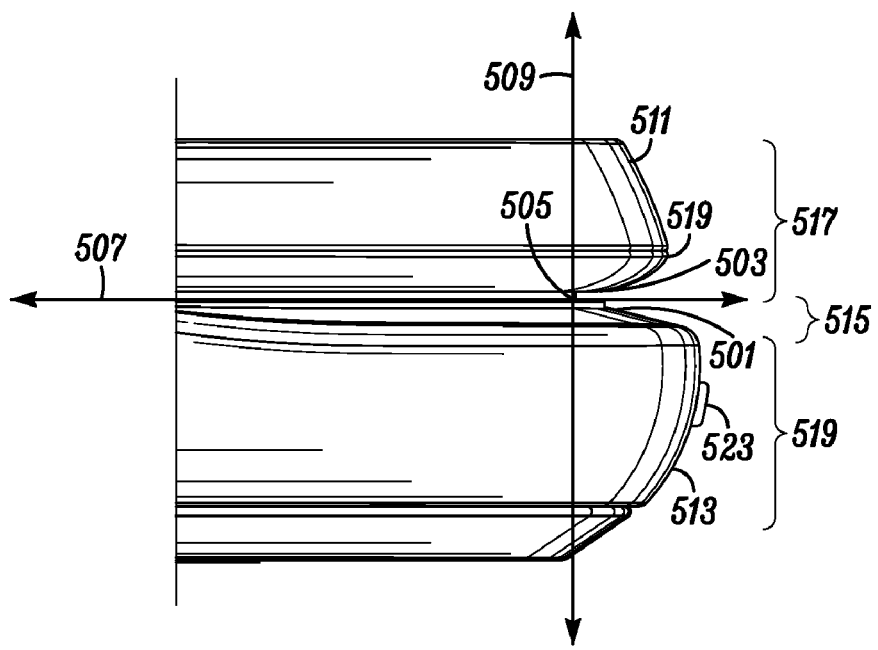
FIG. 5 is an enlarged view of a portion of the embodiment of FIG. 4.

FIG. 5 is an enlarged view of a portion 423 of the embodiment of FIG. 4. As shown, the groove 413 includes a first angled surface 501, a second angled surface 503 and a meeting point 505 where the first and second angled surfaces meet. The first angled surface 501 angles downward from the meeting point 505 relative to a horizontal axis 507, in which the horizontal axis is substantially parallel to the front surface of the portable electronic device. The second angled surface 503 angles upward from the meeting point 505 relative to the horizontal axis 507. For clarity and perspective, FIG. 5 also provides a vertical axis 509 that is perpendicular to the horizontal axis 507 and the front surface. The angled surface 501 is angled relative to the horizontal axis 507.

The side surface of the device is coupled to the front surface and, in addition to the first and second angled surfaces 501, 503 of the groove 413, further includes a forward surface 511 between the second angled surface and the front surface and a back surface 513 between the first angled surface and the bottom surface. On the other hand, it is to be understood that the angles and configurations of the embodiment shown in FIG. 5 is intended by example, and the present invention is not restricted by these particular angles and configurations. Generally, there are three partitions to the side surface of the device, namely an angled surface partition 515, a forward side partition or portion 517 and a back side partition 519. The angled surface partition 515 is located between the forward and back side partitions 517, 519. The forward side partition 517 is located between the angled surface 501 and the front surface of the device. The back side partition 519 is located between the angled surface 501 and the back surface of the device. The angled surface 501 is not adjacent to the front surface but, instead, is offset from the front surface since the forward side partition 517 is located therebetween. Since the forward side partition 517 includes a protruding portion 519 located above at least a portion of the indicator relative to the vertical axis 509, the indicator of the angled surface 501 is at least partially obscured by the protrusion when indicator is viewed from the front of the device.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A portable electronic device comprising:
a front surface substantially parallel to a horizontal axis;

a side surface, connected to the front surface, including a groove having a first angled surface, a second angled surface and a meeting point where the first and second angled surfaces meet, wherein the first angled surface angles downward from the meeting point relative to the horizontal axis, and the second angled surface angles upward from the meeting point relative to the horizontal axis;

an indicator located at the first angled surface of the groove; and an actuator located in proximity to the indicator, wherein the indicator indicates a function associated with the actuator.

2. The portable electronic device of claim 1, further comprising a protruding portion located above at least a portion of the indicator relative to a vertical axis perpendicular to the horizontal axis.

3. The portable electronic device of claim 1, further comprises a circuit coupled to a light source, the circuit being capable of controlling whether the indicator may be illuminated by the light source.

4. The portable electronic device of claim 1, wherein the first angled surface angles downward away from the front surface relative to the meeting point at a first angle greater than parallel to the horizontal axis but less than perpendicular to the horizontal axis, and the second angled surface angles upward toward the front surface relative to the meeting point at a second angle greater than parallel to the horizontal axis but less than perpendicular to the horizontal axis.

5. The portable electronic device of claim 4, wherein the first angle is greater than the second angle.

6. The portable electronic device of claim 1, further comprising a display, a user interface, audio input and audio output accessible at the front surface.

7. A portable electronic device having a slider form factor comprising:

a first housing having an upper surface; and a second housing having a lower surface slidably coupled to the upper surface of the first housing, wherein the second housing is capable of sliding to a closed position relative to the first housing in which upper and lower surfaces are substantially adjacent and concealed, and wherein the second housing is capable of sliding to an open position relative to the first housing in which only a portion of the upper and lower surfaces are adjacent and concealed and the remainders of the upper and lower surfaces are offset and exposed, wherein the upper surface of the first housing includes a first angled surface that is angled relative to the upper surface, the lower surface of the second housing includes a second angled surface that is angled relative to the lower surface, and the first and second angles are angled away from each other, wherein an indicator is located at the first angled surface of the upper surface of the first housing, and wherein an actuator of the first housing is located in proximity to the indicator, wherein the indicator indicates a function associated with the actuator.

8. The portable electronic device of claim 7, further comprising a protruding portion of the second housing located above at least a portion of the indicator of the first housing.

9. The portable electronic device of claim 7, further comprises a circuit of the first housing coupled to a light source of the first housing, the circuit being capable of controlling whether the indicator may be illuminated by the light source.

10. The portable electronic device of claim 7, wherein the first angled surface angles downward away from adjacent portions of the upper and lower surfaces, and the second angled surface angles upward away from adjacent portions of the upper and lower surfaces.

11. The portable electronic device of claim 7, further comprising a display and a first user interface supported by the second housing, and a second user interface supported by the first housing.

12. The portable electronic device of claim 11, further comprising audio input and audio output supported by the second housing, and a wireless transceiver supported by the first housing.

* * * * *